(12) United States Patent
Mashitani et al.

(10) Patent No.: US 8,700,309 B2
(45) Date of Patent: *Apr. 15, 2014

(54) MULTIPLE VISUAL DISPLAY DEVICE AND VEHICLE-MOUNTED NAVIGATION SYSTEM

(75) Inventors: Ken Mashitani, Neyagawa (JP); Hideyuki Kanayama, Uji (JP)

(73) Assignee: Vision3D Technologies, LLC, Mountain View, CA (US)

(*) Notice: Subject to any disclaimer, the term of this patent is extended or adjusted under 35 U.S.C. 154(b) by 83 days.

This patent is subject to a terminal disclaimer.

(21) Appl. No.: 13/241,375

(22) Filed: Sep. 23, 2011

(65) Prior Publication Data

US 2012/0013559 A1 Jan. 19, 2012

Related U.S. Application Data

(63) Continuation of application No. 11/727,747, filed on Mar. 28, 2007, now Pat. No. 8,050,858.

(30) Foreign Application Priority Data

Mar. 29, 2006 (JP) ................................. 2006-091731

(51) Int. Cl.
*G01C 21/00* (2006.01)

(52) U.S. Cl.
USPC ............ 701/400; 701/418; 701/432; 701/459

(58) Field of Classification Search
USPC ........................................................ 701/400
See application file for complete search history.

(56) References Cited

U.S. PATENT DOCUMENTS

| | | | |
|---|---|---|---|
| 6,317,739 B1* | 11/2001 | Hirata et al. ........................ 1/1 |
| 6,351,705 B1* | 2/2002 | Yoshioka ....................... 701/538 |
| 6,377,295 B1* | 4/2002 | Woodgate et al. .............. 348/59 |
| 7,098,812 B2* | 8/2006 | Hirota ........................... 340/439 |
| 7,239,947 B2* | 7/2007 | Suzuki ........................... 701/36 |
| 7,580,186 B2* | 8/2009 | Mather et al. ................. 359/463 |
| 7,898,436 B2* | 3/2011 | Galos ....................... 340/995.17 |
| 2002/0069215 A1* | 6/2002 | Orbanes et al. .............. 707/500 |
| 2003/0214391 A1* | 11/2003 | Kondo et al. .............. 340/425.5 |
| 2007/0139371 A1* | 6/2007 | Harsham et al. .............. 345/156 |
| 2007/0198141 A1* | 8/2007 | Moore ............................. 701/3 |
| 2009/0058845 A1* | 3/2009 | Fukuda et al. ................ 345/214 |
| 2009/0273575 A1* | 11/2009 | Pryor ............................ 345/173 |

* cited by examiner

*Primary Examiner* — Khoi Tran
*Assistant Examiner* — Nicholas Kiswanto
(74) *Attorney, Agent, or Firm* — DC Patent Lawyers, PLLC (57) ABSTRACT

In a vehicle-mounted navigation system, an operating unit that operates the driver's seat side image and an operating unit that operates the passenger's seat side image had to be provided separately, which increased the number of operation buttons and the size of the navigation system device. In a vehicle-mounted navigation system that displays images in multiple directions, an operating direction detector detects which direction an operation was performed from, and a controller controls the vehicle-mounted navigation system based on a detection result of the operating direction detector.

13 Claims, 10 Drawing Sheets

MULTIPLE VISUAL DISPLAY DEVICE AND VEHICLE-MOUNTED NAVIGATION SYSTEM

CROSS REFERENCE TO RELATED APPLICATION

This application is a continuation of application Ser. No. 11/727,747, filed on Mar. 28, 2007, which claims priority based on 35 USC 119 from prior Japanese Patent Application No. 2006-091731 filed on Mar. 29, 2006, the entire contents of which are incorporated herein by reference.

BACKGROUND OF THE INVENTION

1. Field of the Invention

The invention relates to a display device mountable in e.g. a vehicle-mounted navigation system for displaying different images in multiple directions. More specifically, the invention relates to a device that controls an operation based on which direction of the display device the operation was performed from.

2. Description of Related Art

Japanese Laid-Open No. 2000-36927 for example proposes a vehicle-mounted navigation system as a conventional display device that displays different images in multiple directions. On the other hand, Japanese Laid-Open No. 2004-67031 proposes a vehicle-mounted navigation system that restricts an operation by detecting which direction the device was operated from, even though this device does not display multiple images.

Japanese Laid-Open No. 2000-36927 describes a device that displays multiple images in different directions by lenticular lens and a parallax barrier, or by a display device that alternately displays temporally varying images and glasses that alternately perform light transmittance and light shielding. This device makes it possible to display to the passenger's seat side an image without being restricted by the driving status.

Japanese Laid-Open No. 2004-67031 describes a device in which an infrared camera is positioned to capture an image of an operating unit of a vehicle-mounted navigation system, and the device detects which of the driver's seat direction or the passenger's seat direction the operation was performed from, based on the position of the hand of the operator during the operation. This device thus partially prohibits an operation from the driver's seat side. This device makes it possible to partially restrict only an operation from the driver's seat side and eliminates restriction on the operation from the passenger's seat side.

However, Japanese Laid-Open No. 2000-36927 suffers a limitation that an operation means for the driver's seat side image and an operation means for the passenger's seat side image had to be provided separately, which was confusing to an operator due to the increased operation buttons and which also increases the device size. Even though the device described in Japanese Laid-Open No. 2004-67031 may restrict an operation from the driver's seat side, the device does not restrict displaying an image that interferes with driving, such as a TV image or long text to the driver's seat side.

SUMMARY OF THE INVENTION

The invention was made in consideration of the above. One aspect of the visual display device includes a multiple visual display that displays a first image in a first direction and a second image in a second direction; an operating unit that is operable from the first direction and the second direction; an operating direction detector that detects which of the first direction and the second direction an operation was performed from; and a controller that controls the visual display device corresponding to the first image or the second image based on a detection result of the operating direction detector and an operation performed to the operating unit.

The operating unit preferably is a touch panel. The first image includes a first operation button for the first image and the second image includes a second operation button for the second image. Preferably, the controller controls the visual display device corresponding to the first image when the operating direction detector detects an operation from the first direction and a region of the touch panel corresponding to the first operation button is operated, and the controller controls the visual display device corresponding to the second image when the operating direction detector detects an operation from the second direction and a region of the touch panel corresponding to the second operation button is operated.

One aspect of the vehicle-mounted navigation system according to the invention includes the above-described visual display device in which one of the first direction and the second direction corresponds to a driver's seat direction and the other of the first direction and the second direction corresponds to a passenger's seat direction, and the operating unit is operable from the driver's seat direction and the passenger's seat direction, and the vehicle-mounted navigation system is controlled based on a detection result of the operating direction detector and an operation to the operating unit.

Preferably, the first image and the second image each includes an operation button that performs a common control, and when an operation from one of the driver's seat direction and the passenger's seat direction is restricted, the operation button displayed in the driver's seat direction and the operation button displayed in the passenger's direction are displayed in a different manner. Moreover, when one of the operation buttons is operated to change a displayed image, an image in the driver's seat direction is preferably replaced with an image that does not interfere with driving, if the image in the driver's seat direction is an image that is likely to interfere with driving.

Also, the vehicle-mounted navigation system preferably includes a speed input part to which speed signals corresponding to vehicle speed is inputted, and the controller conforms the first image and the second image when the speed signals indicate below a predetermined speed.

At least one of the first image and the second image preferably includes an operating direction detection button, and when the operating direction detection button is operated, the operating direction detector determines that an operation was performed from a direction designated by the operation direction detection button for a predetermined period of time after the operation of the operation direction detection button.

DETAILED DESCRIPTION OF EMBODIMENTS

Example 1

The first embodiment will be described with reference to the accompanying drawings below.

Figure 1:
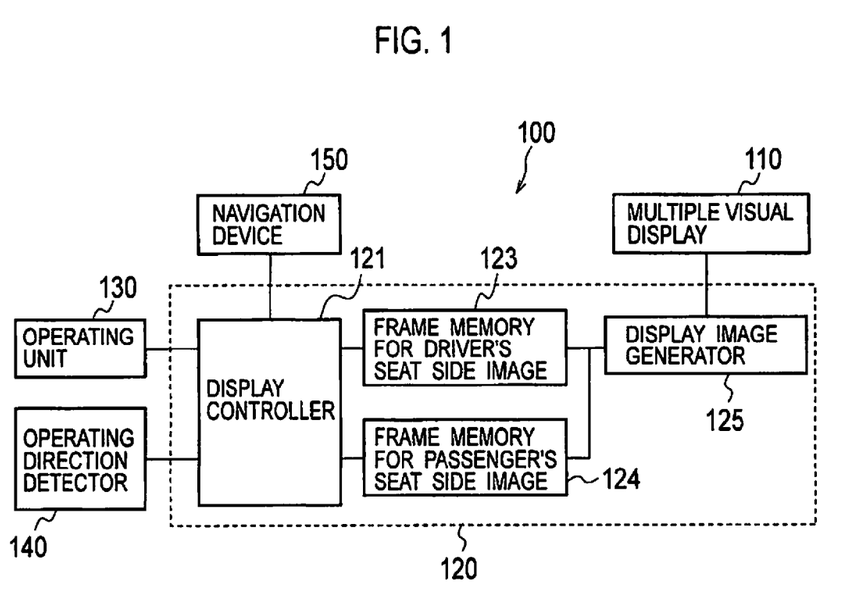
FIG. 1 is a block diagram showing a vehicle-mounted navigation system according to a first embodiment.

FIG. 1 is a block diagram showing vehicle-mounted navigation system 100. Vehicle-mounted navigation system 100 is mounted to the front of the passenger's seat and the driver's seat, and has navigation device 150, multiple visual display 110 that is capable of displaying two images in one screen in the separate directions of the driver's seat side and the passenger's seat side, image processor 120 that generates an image displayed in the multiple visual display, operating unit 130 that operates vehicle-mounted navigation system 100, and operating direction detector 140 that detects which direction of the seat the vehicle-mounted navigation system was operated from.

Navigation device 150 has a built-in map database, a GPS (Global Positioning System) receiver, an autonomous navigation sensor and so on. Navigation device 150 detects the present position of the vehicle using the map database, GPS receiver and autonomous navigation sensor, and outputs image signals of the vehicle's present position, its surrounding map image, an enlarged view of a traffic intersection with an arrowhead showing the vehicle's traveling direction and so on ("map image"). Navigation device 150 also retains images (images such as operation buttons and menus) for operations necessary to operate vehicle-mounted navigation system 100, TV, audio, DVD reproducing unit, and other database (telephone directory DB, shop DB), and outputs audio, images, text etc. according to need.

Multiple visual display 110 can display a driver's seat side image (first image) and a passenger's seat side image (second image) respectively to the driver's seat side direction (first direction) and the passenger's seat side direction (second direction) that are separate directions within a certain angle range (viewing angle), by using mechanisms such as a parallax barrier and lenticular lens.

Without using the above described mechanisms, a driver's seat side image and a passenger's seat side image can be displayed toward the separate directions in effect by alternately displaying the driver's seat side image and the passenger's seat side image temporally, and using driver's seat side liquid crystal shutter glasses that transmit light when the driver's seat side image is displayed and that block light when the passenger's seat side image is displayed, and using passenger's seat side liquid crystal shutter glasses that block light when the driver's seat side image is displayed and that transmit light when the passenger's seat side image is displayed.

Image processor 120 has display controller 121, driver's seat side visual frame memory 123 for storing driver's seat side image (V1), passenger's seat side visual frame memory 124 for storing passenger's seat side image (V2), and display image generator 125. At the image processor, an image to be displayed is processed based on signals from operating unit 130, operating direction detector 140 and navigation device 150, as well as based on the display mode. There are two kinds of display methods, which are a non-sharing mode and a partial-sharing mode, as will be described below.

Display controller 121 reads out an image by receiving command from operating unit 130, operating direction detector 140, and navigation device 150, and changes at least one of the driver's seat side visual frame memory 123 and passenger's seat side visual frame memory 124 according to the display mode.

Display image generator 125 synthesizes an image such that V1 and V2 are alternately arranged in a stripe state when multiple visual display 110 is equipped with a parallax barrier and lenticular lens. When the above-described liquid crystal shutters are used, display image generator 125 controls the display image so that an image is alternately displayed in terms of time.

Operating unit 130 is e.g. a touch panel. Touch panel 130 is provided on the surface of multiple visual display 110. Operation of vehicle-mounted navigation system 100 is performed by touching an area within multiple visual display 110 that corresponds to an operation button displayed in V1 or V2.

Operating direction detector 140 detects an operating direction by using e.g. an infrared camera and image processing. In particular, an infrared camera is positioned such that touch panel 130 of vehicle-mounted navigation system 100 is caught on the camera, and an operator's hand is detected by the temperature of the operator at the time of the operation, thus finding a gravity center position of the operator's hand. If the gravity center was in the driver's seat direction, operation from the driver's seat direction is detected, and if the gravity center was in the passenger's seat direction, operation from the passenger's seat direction is detected.

Next, an operation of the vehicle-mounted navigation system of the embodiment will be explained using the flow chart shown in FIG. 2. First, a switch for the vehicle-mounted navigation system is turned on to start the system. When the system is switched on, an initial image is read from navigation device 150. A driver's seat side image and a passenger's seat side image are processed according to the display mode and are respectively set in frame memories. Once the images are set in frame memories, the images are synthesized and displayed.

In step S201, operation of touch panel 130 is determined. If it was determined that the touch panel was operated, then the process moves to step S202. If it was not determined that the touch panel was operated, then the process repeats step S201. Touch panel 130 was determined as having been operated if it was touched.

In step S202, it is determined whether the operation was made from the driver's seat side direction or from the passenger's seat side direction from operating direction detector 140, and the process moves to step S203.

In step S203, current display mode is determined as described below. If the display mode is set to a non-sharing mode, the process moves to step S204, and if the display mode is set to a partial-sharing mode, then the process moves to step S205. The display mode setting can be performed separately by operating the navigation system.

In step S204, image processor 120 operates in the non-sharing mode, and then the process goes back to step S201. In step S205, image processor 120 operates in the partial-sharing mode, and then the process goes back to step S201. An operation of the partial-sharing mode will be described below.

<<First Display Mode>>

Figure 3:
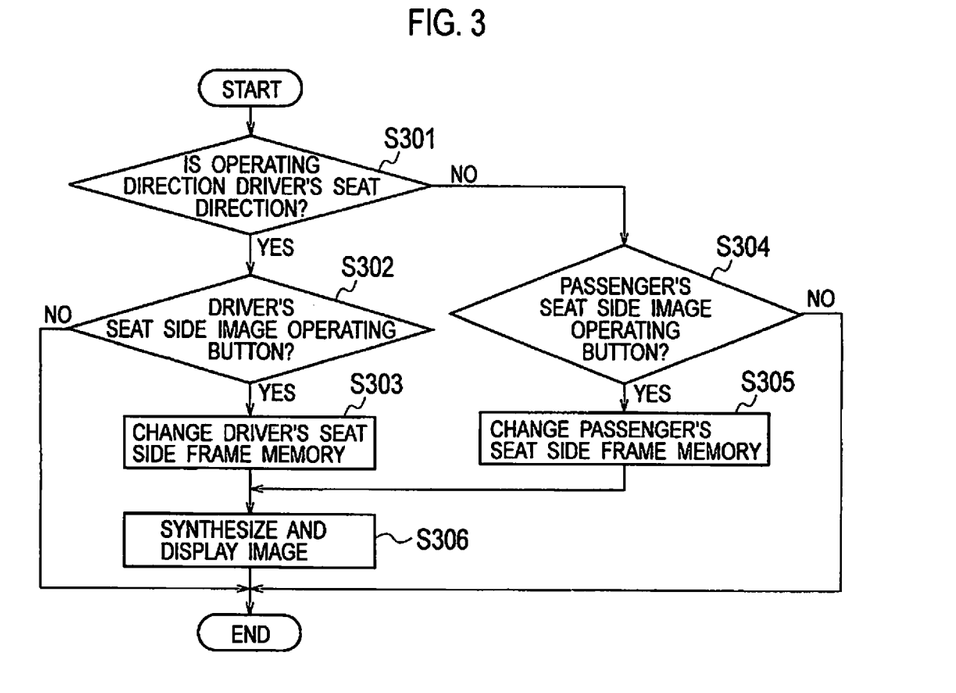
FIG. 3 is a flow chart showing an operation of an image processing device in a non-sharing mode.
Figure 4A:
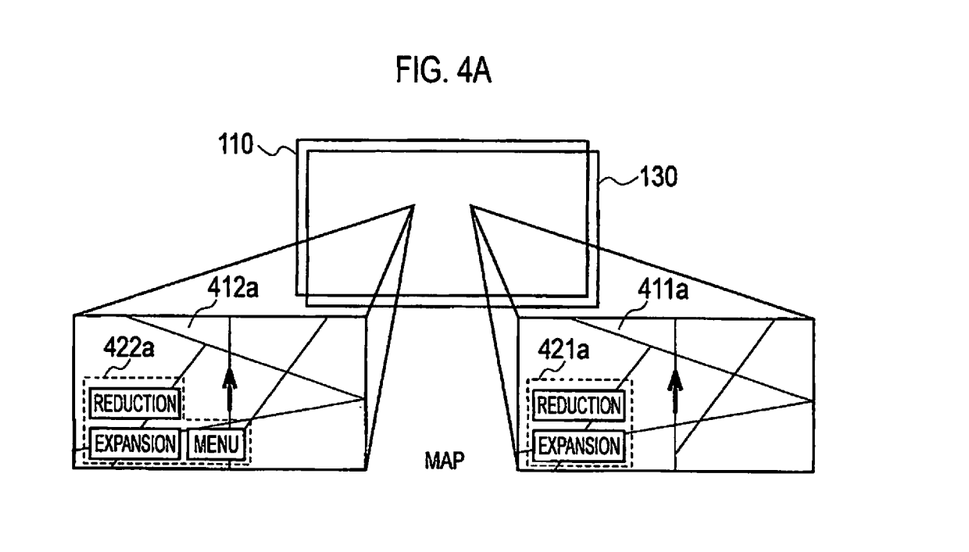
FIGS. 4A and 4B are transition diagrams of a display image in the non-sharing mode.
Figure 4B:
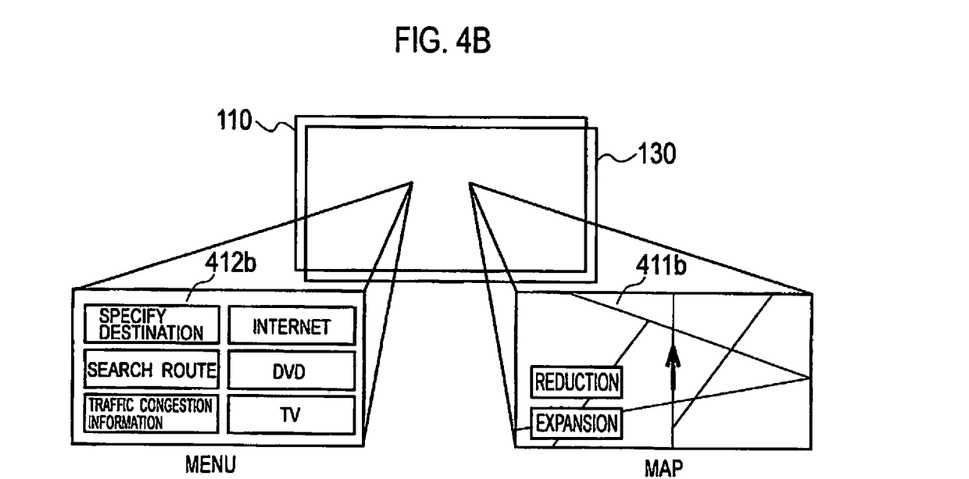

An operation of image processor 120 in the non-sharing mode is explained below in reference to the flow chart of FIG. 3 and the transition diagrams of a display image in the non-sharing mode as shown in FIGS. 4A and 4B.

Figure 2:
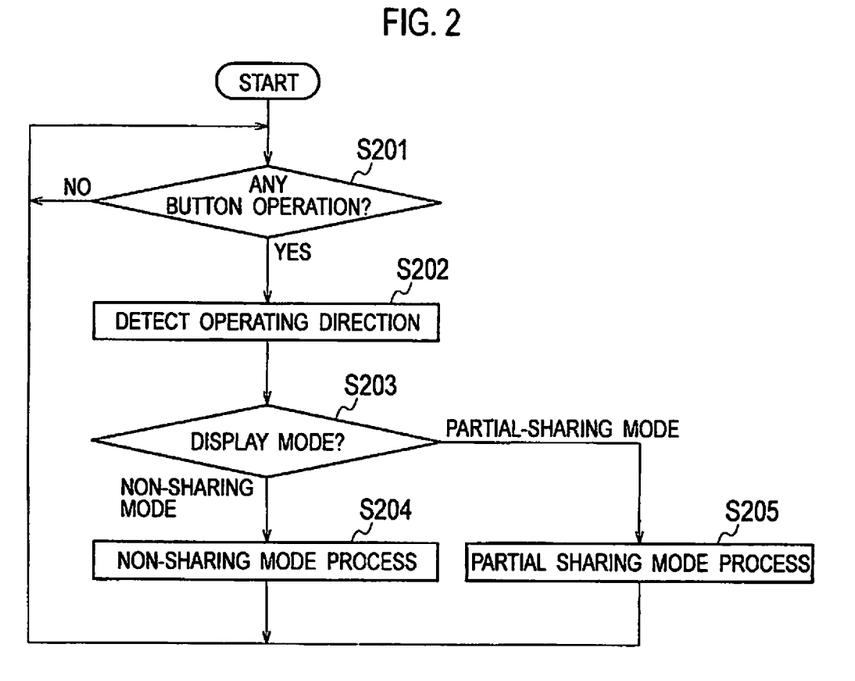
FIG. 2 is a flow chart showing an operation of the vehicle-mounted navigation system according to the first embodiment.

In the non-sharing mode, an initial image is read from navigation device 150 at the start of FIG. 2. Driver's seat side image 411a and passenger's seat side image 412a are set in their respective frame memories. Then the images are synthesized at display image generator 125 and displayed. This occurs when driver's seat side image operation buttons 421a for operating driver's seat side image 411a are set in driver's seat side image 411a, and passenger's seat side image operation buttons 422a for operating passenger's seat side image 412a are set in passenger's seat side image 412a. Then, after step S201 and S202 have been performed, the process moves to operation step S301 of image processor 120 as shown in FIG. 3.

In step S301, detection step S202 determines whether the operating source is from the direction of the driver's seat. If it was determined that an operation was performed from the driver's seat direction, then the process moves to step S302. If it was determined that an operation was performed from the passenger's seat direction, then the process moves to step S304.

In step S302, if an operation was performed on a region of driver's seat side image operation buttons 421a of touch panel 130, the process moves to step S303 by determining that driver's seat side image operation buttons 421a was performed. If an operation was performed on a region other than from driver's seat side image operation buttons 421a, then the process is ended by determining that driver's seat side image operation buttons 421a were not performed.

In step S303, display controller 121 reads an image and operation buttons for the driver's seat side after the change from navigation device 150. Display controller 121 then sets the image and the operation buttons for the driver's seat side after the change in driver's seat side visual frame memory 123, and the process moves to step S306.

In step S304, if an operation was performed on a region of passenger's seat side image operation buttons 422a of touch panel 130, the process moves to step S305 by determining that passenger's seat side image operation buttons 422a have been activated. If an operation was performed on a region other than at passenger's seat side image operation buttons 422a, then the process is ended by determining that passenger's seat side image operation buttons 422a were not activated.

In step S305, display controller 121 reads out an image and operation buttons for the passenger's seat side after the change from navigation device 150. Display controller 121 then sets the image and the operation buttons for the passenger's seat side after the change in passenger's seat side visual frame memory 124, and the process moves to step S306.

In step S306, display image generator 125 generates an image suitable for the display device from driver's seat side visual frame memory 123 and passenger's seat side visual frame memory 124, and the process ends.

Through the described structures and steps, if a menu button of passenger's seat side image operation buttons 422a is pressed from the passenger's seat side direction of FIG. 4A for example, then only the passenger's seat side image is changed to a menu image of passenger's seat side image 412b as shown in FIG. 4B. That is, driver's seat side image 411b is not changed and remains the same as driver's seat side image 411a. As such, an operation from the passenger's seat side direction and an operation from the driver's seat side direction can be performed independently.

<<Second Display Mode>>

Figure 5:
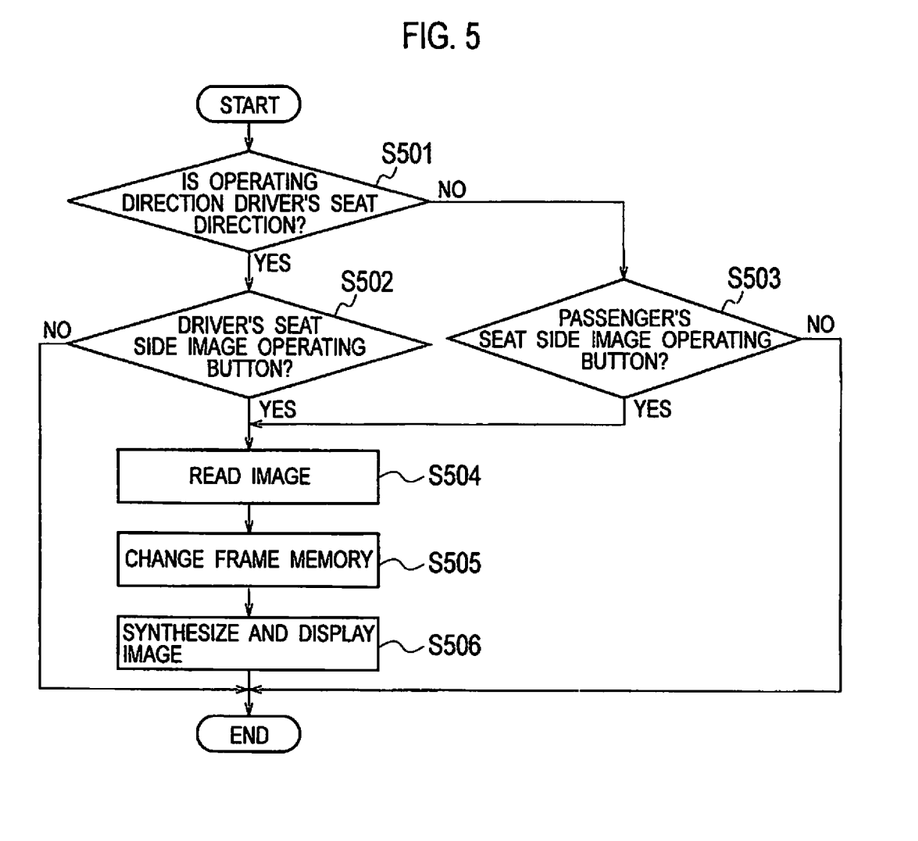
FIG. 5 is a flow chart showing an operation of the image processing device in a partial-sharing mode.
Figures 6A, 6B:
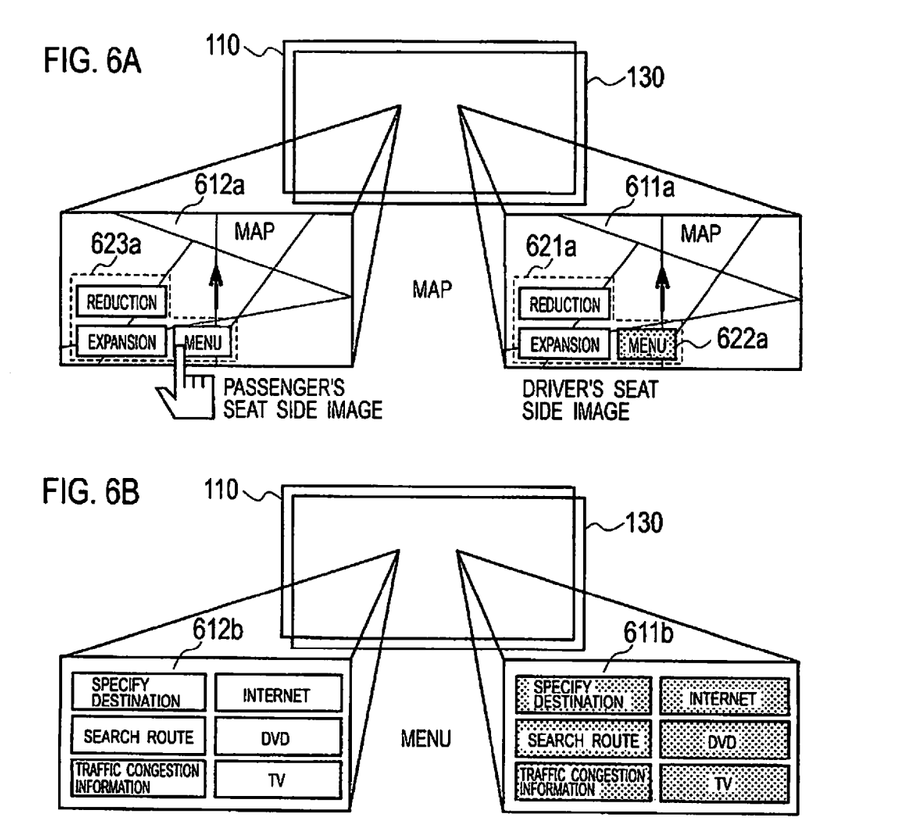
FIGS. 6A to 6C are transition diagrams of a display image in the partial-sharing mode.

An operation of image processor 120 in the partial-sharing mode will be explained below, in reference to the flow chart of FIG. 5 and the transition diagrams of a display image in the partial-sharing mode as shown in FIGS. 6A and 6B.

In the partial-sharing mode, an initial image is read from navigation device 150 at the start of FIG. 2, and driver's seat side image 611a and passenger's seat side image 612a are set in their respective frame memories. Then the images are synthesized at display image generator 125 and are displayed. This occurs when operation buttons are read at the same time, and on driver's seat side image 611a, buttons operable from the driver's seat side direction are set as driver's seat side opearable buttons 621a. If a passenger's-seat-only button is present but inoperable from the driver's seat side direction, then the button is set as a passenger's-seat-operation-only button 622a by emphasizing that the button is inoperable.

As a method to emphasize inoperability, the button may be processed such that it is shown in half-tone dot meshing, in a lighter color than usual, in different color from usual, in smaller size than usual, and so on. In FIG. 6, passenger's-seat-operation-only button 622a is shown in half-tone dot meshing.

Similarly, on passenger's seat side image 612a, buttons operable from the passenger's seat side direction are set as passenger's seat side opearable buttons 623a. A button inoperable from the passenger's seat side is set as a driver's-seat-operation-only button (not shown) by emphasizing that the button is inoperable. Then, when steps S201 and S202 have been performed, the process moves to operation step S501 of image processor 120 as shown in FIG. 5.

Following detection step S202, step S501 determines whether operation is from the driver's seat direction. If it is determined that an operation was performed from the driver's seat direction, then the process moves to step S502. If it was determined that an operation was performed from the passenger's seat direction, then the process moves to step S503.

After determination of an operation of driver's seat side opearable buttons 621a of touch panel 130 in step S502, the process moves to step S504 by determining whether driver's seat side opearable buttons 621a have been manipulated. If an operation was performed on a region other than driver's seat side opearable buttons 621a, then the process is ended by determining that driver's seat side opearable buttons 621a were not manipulated.

In step S503, if an operation was performed on a region of passenger's seat side opearable buttons 623a of touch panel 130, the process moves to step S504 by determining that passenger's seat side opearable buttons 623a were manipulated. If an operation was performed on a region other than passenger's seat side opearable buttons 623a, then the process is ended by determining that passenger's seat side opearable buttons 623a were not manipulated.

In step S504, an image that corresponds to the operation content performed at step S502 or S503 is read from navigation device 150. This occurs when operation buttons for the image are also read at the same time. The process then moves to step S505.

In step S505, the image and the operation buttons that were read at step S504 are set in driver's seat side visual frame memory 123 and passenger's seat side visual frame memory 124. At this time, if the image is a content that may cause a problem for driving, the image is converted to an image that does not cause a problem for driving and is set in driver's seat side visual frame memory 123. If the image is a content that does not cause a problem for driving, then the image is set in driver's seat side visual frame memory 123 without change.

The content that cause a problem for driving may be e.g. a TV or other moving picture, long text and so on. When storing these images in driver's seat side visual frame memory 123, these images are converted to text such as "TV picture", "Explanatory text" and so on, and stored in the driver's seat side frame memory.

At this time, operation buttons are also read, and on the driver's seat side image, buttons operable from the driver's seat side direction are set as driver's seat side opearable buttons, and buttons inoperable from the driver's seat side direction are set as passenger's-seat-operation-only buttons by emphasizing that the buttons are inoperable. Similarly, on the passenger's seat side image, buttons operable from the passenger's seat side direction are set as passenger's seat side opearable buttons without change, and buttons inoperable from the passenger's seat side are set as driver's-seat-operation-only buttons by emphasizing that the buttons are inoperable. After the image is set to the frame memory(ies), the process moves to step S506.

In step S506, display image generator 125 generates an image suitable for the display device from driver's seat side visual frame memory 123 and passenger's seat side visual frame memory 124, and the process ends.

Through the described structures and steps, common control can be asserted over the driver's seat side image and to the passenger's seat side image. For example, if a menu button of the passenger's seat side opearable buttons 623a is pressed from the passenger's seat side direction in FIG. 6A, both the driver's and passenger's images are changed to a menu screen, as shown in FIG. 6B. Here, operation buttons of passenger's seat side image 612b are displayed without change because these operation buttons are operable from the passenger's seat, whereas driver's seat side image 611b are displayed with its operation buttons shown in half-tone dot meshing and is inoperable. As such, the operation flow can be easily grasped for a driver when a passenger assists part of the manipulation by the driver.

Figure 6C:
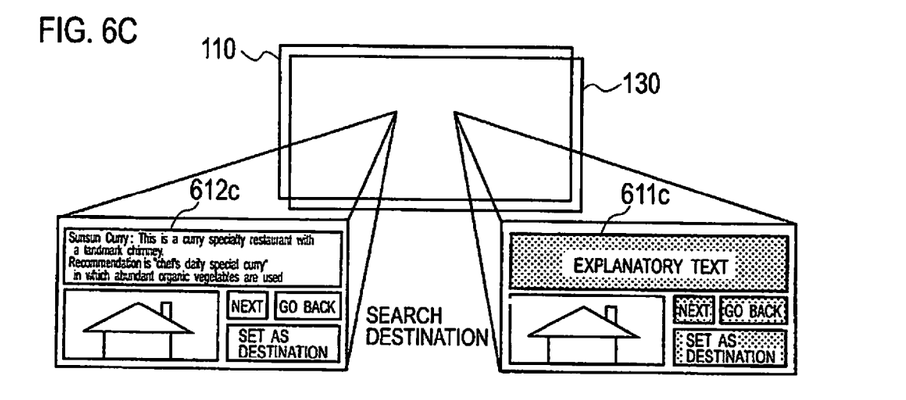

FIG. 6C shows a state in which destination information is displayed by executing a further operation at the passenger's seat side. Detailed destination information is given at passenger's seat side image 612c. However, this information is replaced by the letters "EXPLANATORY TEXT" at driver's seat side image 611c. As such, by replacing an image that may cause a problem for driving with another, more simple corresponding image, driving safety can be improved.

Example 2

A second embodiment will be described with reference to the accompanying drawings below.

Figure 7:
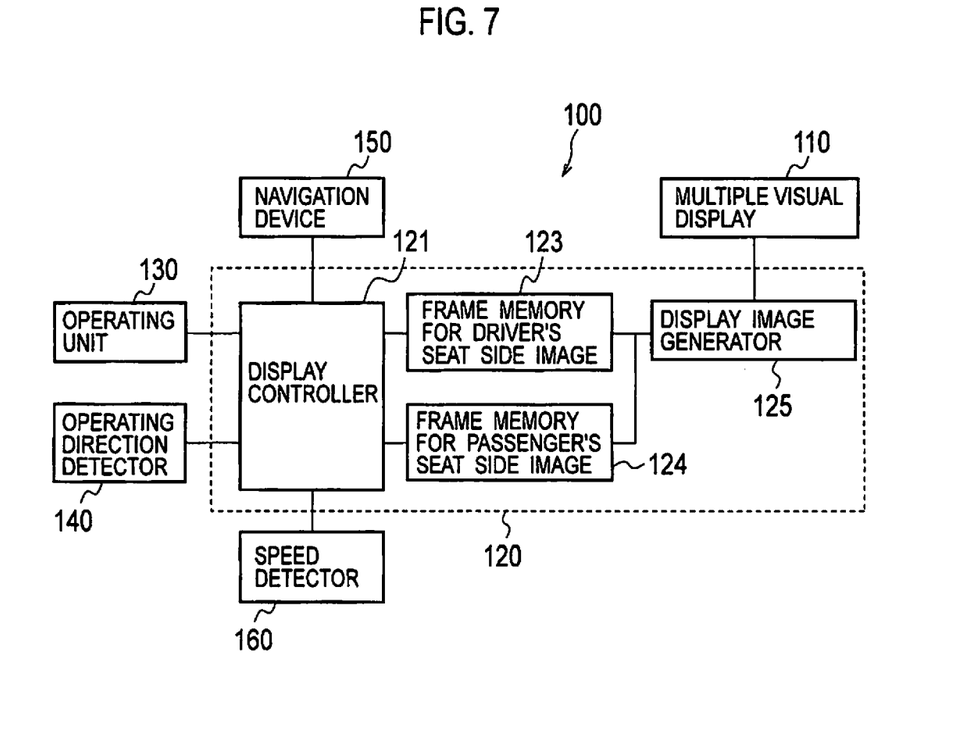
FIG. 7 is a block diagram showing a vehicle-mounted navigation system according to a second embodiment.

FIG. 7 is a block diagram showing a vehicle-mounted navigation system of the second embodiment. Compared to FIG. 1 that shows the first embodiment, the second embodiment differs by including vehicle speed detector 160.

By having such a structure, if the vehicle speed is faster than a set speed, it can be determined that the vehicle is in a travel state. When it was determined that the vehicle is in a travel state, display is made in the display mode of the first embodiment. When it was determined that the vehicle is not in the travel state, then display is made in the display mode of this embodiment ("complete-sharing mode" below). Selection between the non-sharing mode and partially-sharing mode is arbitrarily changeable by changing the car navigation settings.

Figure 8:
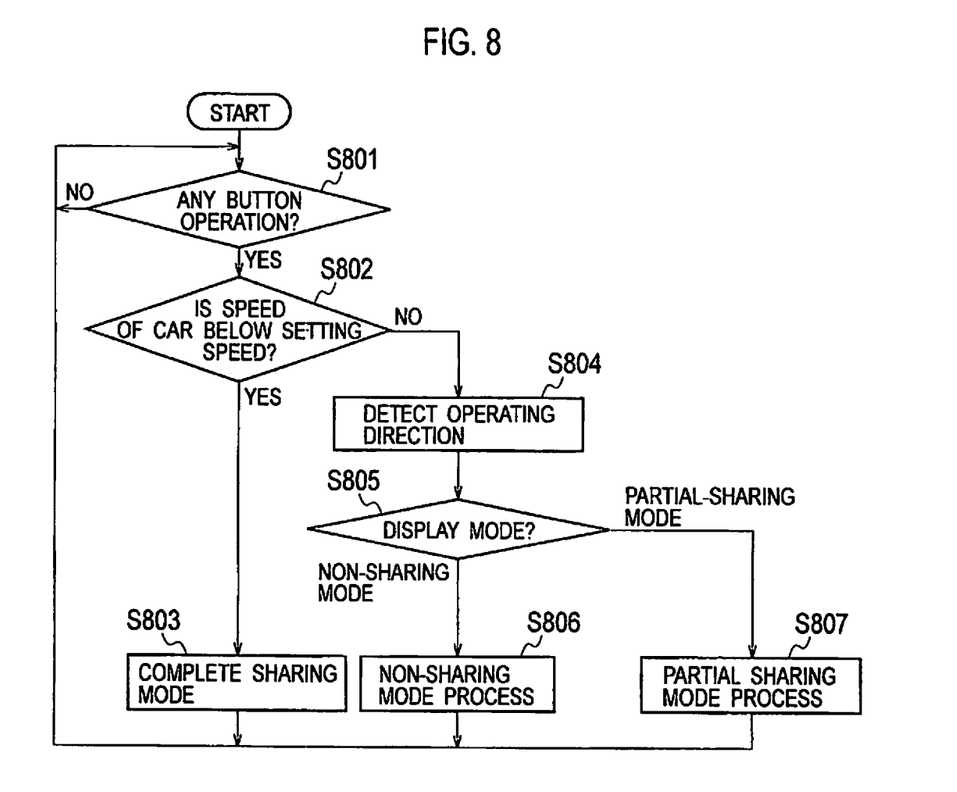
FIG. 8 is a flow chart showing an operation of the vehicle-mounted navigation system according to the second embodiment.

FIG. 8 shows a flow chart showing an operation of the vehicle-mounted navigation system according to the second embodiment. First, a switch for the vehicle-mounted navigation system 100 is turned on to start the system. When the system is switched on, an initial image and corresponding operation buttons are read from navigation device 150 and respectively are set in driver's seat side visual frame memory 123 and passenger's seat side visual frame memory 124. Then an image is synthesized at display image generator 125 and displayed.

In step S801, it is determined whether or not touch panel 130 was operated. If it was determined that the touch panel was operated, then the process moves to step S802. If it was not determined that the touch panel was operated, then the process repeats step S801. Touch panel 130 was determined as having been operated if it was touched.

In step S802, it is determined whether or not the vehicle speed is below a set speed. If the speed is below the set speed, then the vehicle is deemed as not in a travel state, and the process moves to a complete-sharing mode of step S803. If the speed is found greater than the set speed, then the process moves to step S804. In step S804, it is determined which direction of the driver's seat side direction or the passenger's seat side direction the operation was performed from, using operating direction detector 140 and the process moves to step S805. In step S805, it is determined what mode the display mode currently is in, and the process moves to step S806 if the setting is in the non-sharing mode, and the process moves to step S807 if the setting is in the partial-sharing mode. In step 806, image processor 120 operates in the non-sharing mode and then the process goes back to step S801. In step S807, image processor 120 operates in the partial-sharing mode, and the process goes back to step S801. Operations in the non-sharing mode and in the partial-sharing mode are as described above.

<<Complete-Sharing Mode>>

Figure 9:
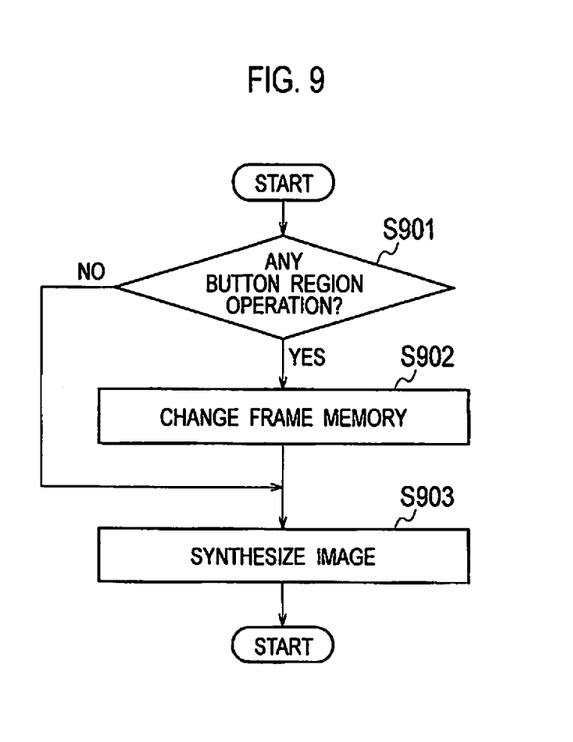
FIG. 9 is a flow chart showing an operation of an image processor in a complete-sharing mode.

FIG. 9 shows a flow chart showing an operation of image processor 120 in the complete-sharing mode of step S803. In step S901, it is determined whether or not touch panel 130 was operated. If it was determined that the touch panel was operated, then the process moves to step S902. If it was not determined that the touch panel was operated, then the process ends.

In step S902, display controller 121 reads out an image and operation buttons from navigation device 150 and sets the same image in driver's seat side visual frame memory 123 and passenger's seat side visual frame memory 124. Then the process moves to step S903.

In step S903, display image generator 125 generates an image suitable for the display device from driver's seat side visual frame memory 123 and passenger's seat side visual frame memory 124. The generated image is displayed at multiple visual display 110.

Through the described structures and steps, when the vehicle is in a travel state, the operation mode can be in the non-sharing mode or the partial-sharing mode. This allows a display without causing a problem for driving. Also, when the vehicle is in a non-travel state, the completely same image can be shared. Therefore, when the vehicle is stopped, information can be shared with the passenger's seat occupant.

Operating direction detector 140 does not require the combination of the infrared camera with the image processor. For example, an alternative method as described below may be used.

That is, operating direction detector 140 can contrived such that an operation start button for starting an operation of the passenger's seat side is displayed only in the passenger's seat image. When the operation start button is activated, the operating direction detector detects that that the device was operated from the passenger's seat side direction during a predetermined period of time after the activation of the operation start button. Operations other than this are detected coming operated from the driver's seat side direction.

Figure 10:
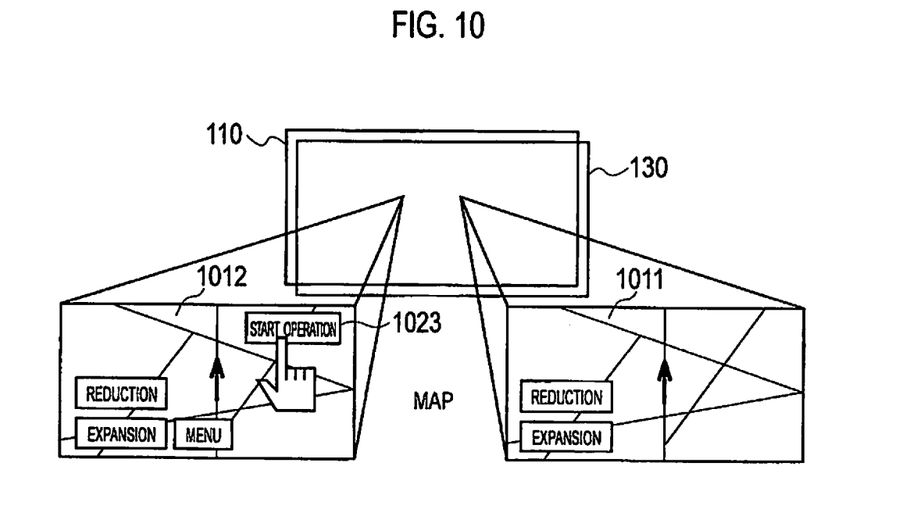
FIG. 10 is a display diagram of when determining an operating direction from an input on the operation start button.

To explain by reference to the display diagram of FIG. 10, in which determination of the operating direction is made based the input of the operation start button, operation start button 1023 is provided only on passenger's seat side image 1012. In this state, if an area other than that corresponding to operation start button 1023 is operated, operating direction detector 140 detects that the device was operated from the driver's seat side. If an area corresponding to operation start button 1023 is operated, during a predetermined period of time thereafter, operating direction detector 140 detects that the operation was made from the passenger's seat side direction. Different variants are contemplated as the predetermined period of time, such as a predetermined period of time after the operation start button is operated, a predetermined period of time after the last operation button was operated, and the time period until a separate operation finish button is manipulated through provision of an operation finish button.

As described above, the control direction side can be detected without the need for a device such as an infrared camera. Therefore, reduced size devices and lower costs can be achieved. Also, an erroneous operation from the driver's seat side direction can be prevented by providing a display location of the operation start button in a random manner as time progresses, or by detecting that the operation was made from the passenger's seat side when all of the multiple operation start buttons were operated, by displaying multiple operation start buttons on the screen.

Moreover, it is also possible to prevent an erroneous operation from the driver's seat side direction by providing a code number input part in the operating direction detector, such that when an operation start button was pressed down, a code number input display is shown only in passenger's seat side image V2, so that the passenger can enter the code number. In this case, if the code number is entered, the operating direction detector detects during a predetermined period of time that the device was operated from the passenger's seat side direction. If the code number is not entered, the operation detector detects that the device was operated from the driver's seat side direction. Different variants are contemplated as the predetermined period of time, such as a predetermined period of time after the operation start button is operated, a predetermined period of time after the last operation button was operated, and the time period until a separate operation finish button is manipulated through provision of an operation finish button.

Figure 11A:
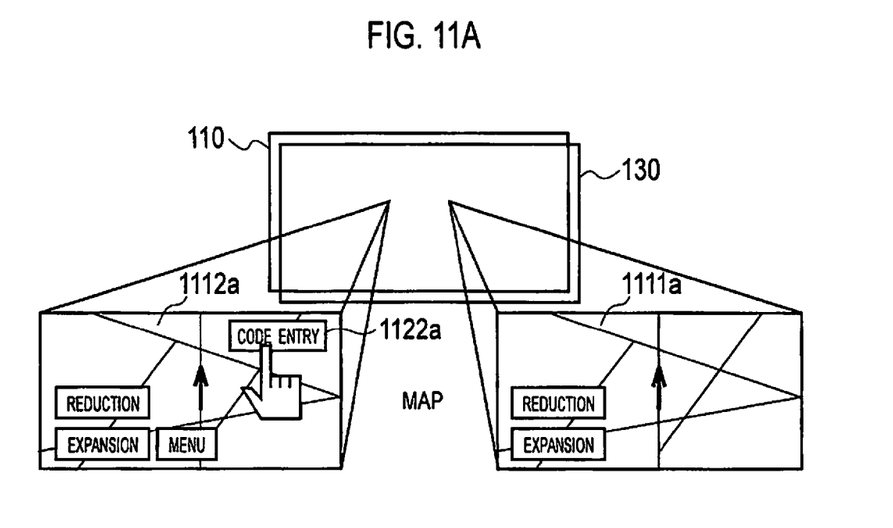
FIGS. 11A and 11B are transition diagrams of a display image in the case of determining an operating direction by a code number input.
Figure 11B:
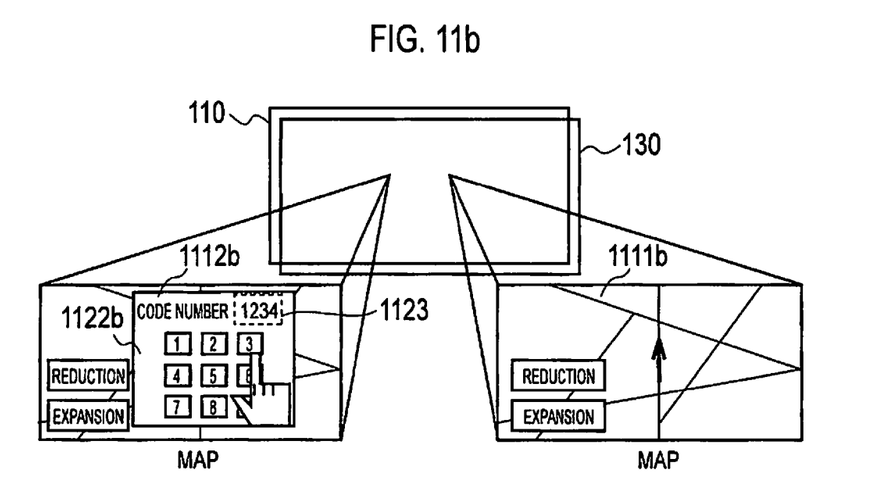

FIGS. 11A and 11B show the transition diagrams of a display image in an example of determining an operating direction by code number input. Here, code number input button 1122a is displayed only on passenger's seat side image 1112a, as shown in FIG. 11A. In this state, if an area other than that corresponding to code number input button 1122a is operated, operating direction detector 140 detects that the device was operated from the driver's seat side. If code number input button 1122a is operated, code number 1123 and code number input part 1122b are displayed on the passenger's seat side image, as shown in FIG. 11B. Operating direction detector 140 detects that the device was operated from the passenger's seat side during a predetermined period of time after the code number is entered. Different variants are contemplated as the predetermined period of time, such as a predetermined period of time after the operation start button is operated, a predetermined period of time after the last operation button was operated, and the time period until a separate operation finish button is manipulated through provision of an operation finish button.

Examples listed here exemplify embodiments in which only the passenger's seat side image has the operation start button or the code number input part. However, these buttons could be displayed on both the driver's seat side image and the passenger's seat side image, and the operating direction detector detects the operating direction by detecting which image's button was manipulated by pressed down. In this case, it is necessary that respective operation buttons do not overlap on the touch panel.

Although an example was described using a touch panel as operating unit 130 in these embodiments, operating unit 130 does not have to be a touch panel. A method in which a pointer is operated on a remote control screen also may be used. In this case, an infrared camera is arranged such that the remote control is captured therein, and a gravity center position of the operator's hand is detected to determine the operating direction.

By providing the above-described structure, miniaturization of the device and separate restrictions of display contents and operations for the respective display directions can be achieved.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes that come within the meaning and range of equivalency of the claims therefore are intended to be embraced therein.

What is claimed is:

1. A visual display device, comprising:
a multiple visual display that displays a first image in a first direction and a second image that differs from the first image in a second direction for two operators to use at the same time;
a touch panel that is operable from a first touch region of the first direction and from a second touch region of the second direction to detect a user operation;
an operating direction detector that detects whether the operation was performed from the first direction or the second direction,
a controller that controls the first image and the second image based on an operation performed by the touch panel,
wherein the controller generates the first image and the second image, the first image comprises a first background image and the first touch region image, the second image comprises a second background image and the second altered touch region image, and
wherein the controller controls the first and the second images differently in response to touch operation.

2. The visual display device of claim 1, wherein the operating direction detector includes an operation direction detection button on one of the first image and the second image,
wherein when the operating direction detection button is operated, the operating direction detector determines that the visual display device is operated from a direction designated by the operating direction detection button during a certain period of time after the operation of the operating direction detection button.

3. The visual display device of claim 1, wherein the second background image is different from the first background image.

4. The visual display device of claim 1, wherein the second direction is different from the first direction.

5. The visual display device of claim 1, wherein the controller controls the first image or the second image based on an operation performed by the touch panel combined with detection result of whether the operation was performed from the first direction or the second direction.

6. The visual display device of claim 1, wherein a passenger's seat only button is inoperable from the driver's seat side direction, and processed differently to emphasize inoperability.

7. The visual display device of claim 1, wherein the multiple visual display comprises a parallax barrier that provide an image that is alternatively displayed as multiple images.

8. The visual display device of claim 1, wherein the multiple visual display comprises lenticular lens that provide an image that is alternatively displayed as multiple images.

9. The visual display device of claim 1, wherein the multiple visual display comprises liquid crystal shutter that provide an image that is alternatively displayed as multiple images.

10. The visual display device of claim 1, wherein only a passenger's seat side image has an operation start button or code number input.

11. The visual display device of claim 1, wherein the operation detector detects the operation direction by detecting which touch region was manipulated.

12. A visual display device, comprising:
a multiple visual display that displays a first image in a first direction and a second image that differs from the first image in a second direction for two operators to use at the same time;
an operating unit that is operable from the first direction and the second direction; and
a controller that generates the first image and the second image, the first image comprises a first background image and a first touch region image, the second image comprises a second background image and a second altered touch region image,
wherein the controller controls the first and the second images differently in response to touch operation,
wherein the operating unit is a touch panel, the first image includes a first operation button within the image for selecting operations from the first image, and the second image includes a second operation button within the image for selecting operations from the second image,
wherein when the first operation button is operated to change a displayed image, the second image is replaced with an image that does not cause a problem for an operator in the second direction.

13. The visual display device of claim 12, wherein the controller controls the first image or the second image based on an operation performed by the touch panel combined with detection result of whether the operation was performed from the first direction or the second direction.

* * * * *